Oct. 30, 1934.                L. W. LESSLER ET AL                1,978,638
                             FILM RETAINING MEANS
                              Filed May 2, 1933
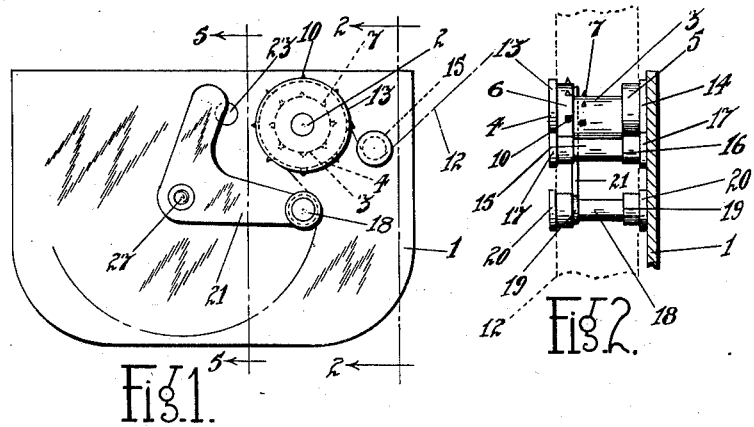
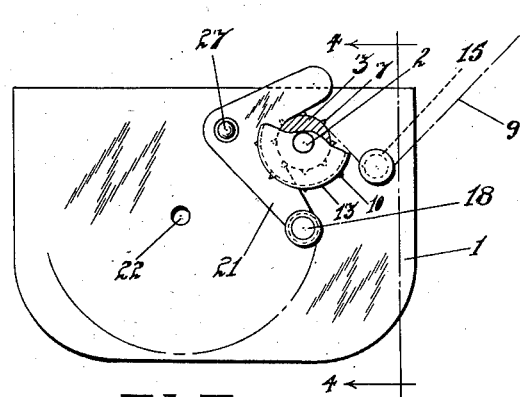
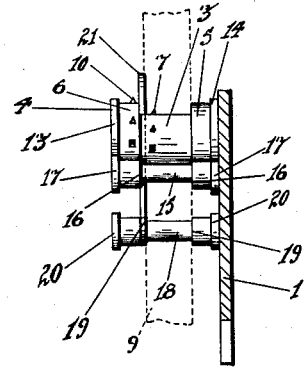
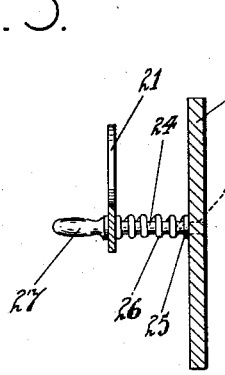
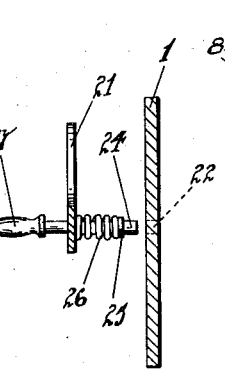
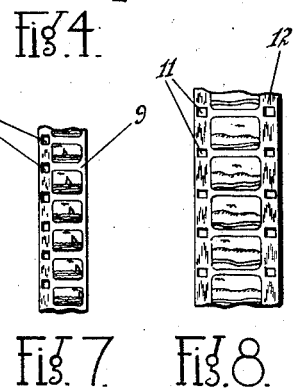
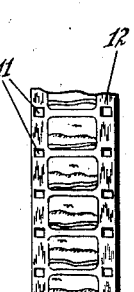
INVENTORS.
LEW W. LESSLER.
CARL BORNMANN.
BY
ATTORNEY.

Patented Oct. 30, 1934

1,978,638

UNITED STATES PATENT OFFICE 1,978,638

FILM RETAINING MEANS

Lew W. Lessler, Johnson City, and Carl Bornmann, Binghamton, N. Y., assignors to Agfa Ansco Corporation, Binghamton, N. Y., a corporation of New York Application May 2, 1933, Serial No. 668,996

2 Claims. (Cl. 271—2.3)

Our invention relates to a film retaining means adapted for use in cooperation with film sprockets with which a film is adapted to engage and be moved thereby.

With a certain type of motion picture apparatus adapted to move a motion picture film therethrough, there has been provided a film sprocket adapted to engage and move either of two widths of film. This sprocket includes two sets of sprocket teeth disposed in different planes and it has proven to be a problem to maintain these films in engagement with the sprocket particularly if one film is substituted for the other as is the case with such an apparatus. By our invention we have provided a simple film retaining device for cooperation with a sprocket of this character which may be adjusted to film retaining position as required for either of the sizes of film.

A further object of our invention lies in the provision of a film gate roller combined as a part of the film retaining means.

Other objects and advantages will be apparent as the description proceeds, reference now being had to the figures of the accompanying drawing forming a part of this application and wherein like reference numerals indicate like parts.

In the drawing:

Figure 1 is a side view of a film sprocket and our improved film retaining and guiding device cooperating therewith.

Figure 2 is an end view thereof taken on the line 2—2 of Figure 1.

Figure 3 is a view similar to Figure 1 with the film retaining device in another position and with certain parts being broken away for clearness of illustration.

Figure 4 is a sectional view taken on the line 4—4 of Figure 3.

Figure 5 is a detail sectional view taken on the line 5—5 of Figure 1.

Figure 6 is a view similar to Figure 5 illustrating the locking means for the film retaining device.

Figures 7 and 8 illustrate the two sizes of film adapted for use in an apparatus embodying our invention.

The reference character 1 indicates a supporting plate upon which is suitably rotatably mounted a shaft 2 secured to which is a film sprocket comprising the inner sprocket 3 and the outer sprocket 4 preferably formed integral from a single piece of material. The inner sprocket 3 lies between the enlarged shouldered portions 5 and 6 of the outer sprocket and is provided with the sprocket teeth 7 appropriately spaced to engage the perforations 8, of the small sized film 9. This inner sprocket 3 is of such a length with the shoulders 5 and 6 as to readily receive the width of the smaller film.

The outer sprocket comprises the shouldered portions 5 and 6 above referred to which are of the same diameter and the outer portion 6 of which is provided with sprocket teeth 10 so spaced as to engage within the perforations 11 along one side of the larger film 12. The portions 5 and 6 of the outer sprocket are provided with shouldered flanges 13 and 14 between which the larger film 12 is received and guided.

Mounted upon the supporting plate 1 is an idler guide roller 15 shouldered as at 16 in alignment with the shouldered portions 5 and 6 and provided with retaining flanges 17 at its ends whereby when either of the films 9 or 12 are threaded around the sprocket, it will be appropriately guided by the roller 15. Figure 1 illustrates the position of the parts with the larger film 12 threaded around the sprocket and Figure 3 illustrates the arrangement when the smaller film 9 is threaded on the sprocket.

Also secured on the supporting plate 1 in position below the sprocket and in fairly close proximity thereto is a stud 18 shouldered as at 19 in alignment with the shouldered portions 16 of the guide roller 15 and provided with end flanges 20. This stud thus forms a guide over which either of the films 9 or 12 may be trained after leaving the sprocket.

The length of the larger outer sprocket 4 and the diameter thereof and the width of the larger film 12 combine to make unnecessary any further retaining means to hold the film on the larger sprocket than the guide roller 15 and stud 18. The smaller length and diameter of the inner sprocket 3 and the narrow width of the film 9, however, makes necessary some form of film retaining means for this smaller film when in position on the sprocket. This means will now be described.

Pivoted upon the stud 18 is a bell crank shaped arm 21, the bight of which when the arm is swung toward the sprocket is adapted to lie directly over the outer edge of the smaller film 9 between the sprocket teeth 7 and the shouldered portion 6 of the larger sprocket. In this position, shown clearly in Figures 3 and 4, it will be clear that the film 9 is retained on the sprocket 3 and prevented from accidental displacement therefrom. When the larger film 12 is threaded on the sprocket the arm 21 is rocked to the position shown in Figure 1 away from the sprocket, in which position it offers no interference with the film 12.

This supporting plate is provided with openings 22 and 23 and the arm 21 is provided with a stud 24 provided adjacent its inner end with a collar 25 between which and the arm 21 is disposed a coil spring 26. The outer end of the stud 24 is provided with a collared finger piece 27 by which the stud 24 may be pulled outwardly against the tension of the spring 26. The inner end of the stud 24 is adapted to engage in either of the openings 22 or 23 depending upon the adjusted position of the arm 21 whereby to lock such arm in its adjusted position.

From the foregoing it will be clear that if the larger film 12 is to be threaded around the sprocket 4, it is first passed over the guide roller 15 and then over the portions 5 and 6 of the larger sprocket, the sprocket teeth 10 engaging within the outer row of perforations 11 of the film. The film is then brought under the sprocket and around the stud 18, the arm 21 being of course, locked in the position shown in Figure 1 out of the way.

If the smaller film 9 is to be used, it is likewise threaded over the guide roller 15 between the shoulders 16 thereof and over the inner sprocket 3, the perforations 8 being engaged by the sprocket teeth 7. It is then drawn under the sprocket and around the stud 18 between the shoulders 19 thereof. The retaining arm 21 is then moved to the position shown in Figures 3 and 4 by manipulating the finger piece 27 as described. In such position the arm 21 lies just over the film at its edge and prevents accidental displacement of the film from the sprocket 3.

The stud 18 serves the dual purpose of a guide for the film and a pivot for the retaining member.

Of course, changes may be made in details of construction and arrangement of parts without departing from the spirit and scope of our invention. We do not limit ourselves therefore, to the exact form herein shown and described other than by the appended claims.

We claim:

1. In combination, a sprocket having separate sets of film engaging teeth in different planes, a film retaining member pivoted for adjustment to a position adjacent the inner of said planes, and means combined with said member for guiding a film with respect to said sprocket, said means and said sprocket having aligned shoulders whereby to receive films of different widths.

2. In combination, a sprocket having separate sets of film engaging teeth in different planes, a film retaining member pivoted for adjustment to a position adjacent the inner of said planes, means combined with said member for guiding a film with respect to said sprocket, said means and said sprocket having aligned shoulders whereby to receive films of different widths, and means for locking said member in the adjusted positions.

LEW W. LESSLER.
CARL BORNMANN.